United States Patent
Cordesses

(10) Patent No.: US 11,216,894 B2
(45) Date of Patent: Jan. 4, 2022

(54) IMAGE-BASED SEMANTIC ACCOMMODATION SEARCH

(71) Applicant: Amadeus S.A.S., Biot (FR)

(72) Inventor: Joel Cordesses, Antibes (FR)

(73) Assignee: AMADEUS S.A.S., Biot (FR)

( * ) Notice: Subject to any disclaimer, the term of this patent is extended or adjusted under 35 U.S.C. 154(b) by 796 days.

(21) Appl. No.: 15/591,309

(22) Filed: May 10, 2017

(65) Prior Publication Data

US 2018/0329926 A1 Nov. 15, 2018

(51) Int. Cl.
| | |
|---|---|
| *G06F 17/30* | (2006.01) |
| *G06Q 50/14* | (2012.01) |
| *G06Q 10/02* | (2012.01) |
| *G06Q 50/12* | (2012.01) |
| *G06F 16/215* | (2019.01) |
| *G06F 16/58* | (2019.01) |
| *G06F 16/583* | (2019.01) |

(52) U.S. Cl.
CPC .......... *G06Q 50/14* (2013.01); *G06F 16/215* (2019.01); *G06F 16/583* (2019.01); *G06F 16/5866* (2019.01); *G06Q 10/02* (2013.01); *G06Q 50/12* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 2002/0091535 | A1* | 7/2002 | Kendall | G06Q 30/0206 705/5 |
| 2003/0225600 | A1* | 12/2003 | Slivka | G06Q 10/02 705/5 |
| 2006/0229899 | A1 | 10/2006 | Hyder et al. | |
| 2008/0091557 | A1* | 4/2008 | Cella | G06Q 30/0601 705/5 |
| 2008/0301006 | A1* | 12/2008 | Holly | G06Q 30/02 705/26.62 |

(Continued)

OTHER PUBLICATIONS

Oriol Vinyals et al., "Show and Tell: A Neural Image Caption Generator", arXiv:1411.4555v2 [cs.CV] Apr. 20, 2015.

(Continued)

*Primary Examiner* — Hung D Le
(74) *Attorney, Agent, or Firm* — Thompson Hine LLP

(57) ABSTRACT

Systems, methods, and computer program products for extracting data from images related to travel accommodation, and performing a search of travel accommodation based on criteria entered by a user. The system collects images related to travel accommodation by querying data sources including images associated with the travel accommodation, processes the images so as to extract an identifying characteristic of the travel accommodation, and represents the identifying characteristic in the form of searchable text keywords and stores the searchable text keywords in the database. The system may receive a user request including travel accommodation-specific criteria via a user interface, search the database for searchable text keywords matching the criteria in the request, and cause the display of travel accommodations represented by the searchable text keywords on the user interface.

17 Claims, 9 Drawing Sheets

(56) References Cited

U.S. PATENT DOCUMENTS

| | | | | |
|---|---|---|---|---|
| 2010/0250601 A1* | 9/2010 | Takata | ............ | G06F 17/30265 |
| | | | | 707/780 |
| 2014/0214461 A1* | 7/2014 | Diliberto | ............... | G06Q 30/02 |
| | | | | 705/5 |
| 2015/0057837 A1* | 2/2015 | Moore, Jr. | ............ | G06Q 10/02 |
| | | | | 701/2 |
| 2015/0168150 A1* | 6/2015 | Kahn | ..................... | H04W 4/21 |
| | | | | 701/408 |
| 2015/0371155 A1* | 12/2015 | Saint-Just | ............. | G06Q 10/02 |
| | | | | 705/5 |
| 2017/0103351 A1* | 4/2017 | Zhang | ................ | G06Q 10/025 |

OTHER PUBLICATIONS

Remi Lebret et al., "Phrase-based Image Captioning", Proceedings of the 32nd International Conference on Machine Learning, Lille, France, 2015. JMLR: W&CP vol. 37. Copyright 2015.

National Institute of Industrial Property, Preliminary Search Report and Written Opinion issued in French Application No. 1754093 dated Feb. 5, 2018.

\* cited by examiner

IMAGE-BASED SEMANTIC ACCOMMODATION SEARCH

TECHNICAL FIELD

The present invention generally relates to computers and computer software, and in particular, to systems, methods, and computer program products to provide searchable keywords for a hotel reservation platform, and to perform a search of travel accommodation based on criteria entered by a user.

BACKGROUND

Computer technology is increasingly used to search for travel accommodation. Generally, travelers or third-party reservation agents may use computer-based devices connected to the Internet to perform a search for hotels, for example through a hotel reservation system or online search tool such as Booking.Com® or TripAdvisor®. A traveler may for example look for a hotel with swimming facilities and a view of mountains near a historical village. The traveler can perform his search by selecting pre-defined criteria on the search page of a hotel distribution channel or by inputting criteria in a text box on the search page. The results obtained by this search may however not be relevant. The predefined criteria on the search page of the hotel distribution channel may indeed not include every criterion of the traveler. Typical hotel distribution channels only allow standardized search queries based on simple search criteria such as the location, the hotel category, the room and service types and the availabilities. The search via free text on the hotel distribution channel may not obtain relevant results either, even if some hotels on the hotel distribution channel do match the criteria input by the user, because their text description in the databases that are searched may be incomplete. The traveler may have seen a picture in an image gallery of a hotel on TripAdvisor®, have forgotten the name of the hotel and not be able to find it by inputting the features identified on the picture. The traveler can enter the criteria as a request in an online search engine such as Google®. The search results will include text articles and hotel websites, and the user can filter them to find what he wants. However, the hotels listed by the search engine are usually selected based on their text description, i.e., a text recounting the characteristics of the hotel, which may be entered by the person who listed the hotel online, for example the owner of the hotel or a marketing/press officer of a hotel chain. This is problematic for several reasons. On the one hand, the hotels found may have a text description containing keywords matching certain criteria entered by the user but not all of them, and may hence not meet the request criteria. On the other hand, hotels meeting the user-specified criteria may not turn up (or hotels not meeting the criteria may turn up) in the search because their text descriptions are not accurate. The traveler may enter his criteria in the Google shopping engine, which is based on image recognition. The results may include items containing one or more criteria entered by the traveler, for example, postcards featuring a hotel with a view of mountains, but the shopping engine does not identify physical hotels meeting the requirements of the traveler.

Because of the limited search options, the traveler may have to spend a lot of time searching for the hotel he has in mind and the results may still not meet his wishes. Travelers may inspect picture galleries to determine whether a hotel fulfils specific criteria, but travel agents lack time to do so.

Thus, improved apparatus, methods, systems, and computer program products are desired to allow for an online search for travel accommodation taking into account user-specified criteria.

SUMMARY

Embodiments of the present invention may improve the efficiency of online searches for travel accommodation based on semantic input, by capitalizing on the data available in images related to travel accommodation.

There is thus provided apparatus, systems, methods, and computer program products for extracting semantic data from images related to travel accommodation, as well as systems, methods, and computer program for performing a search of travel accommodation based on semantic input.

According to an embodiment of the invention, a system includes an apparatus for extracting semantic data from images related to travel accommodation, herein called a semantic feeder apparatus. The semantic feeder apparatus includes an image collector module, an image processor module and an output module. The image collector module is configured, for each travel accommodation, to query at least one data source comprising images associated with the travel accommodation, and to collect at least one image related to the travel accommodation. The image processor module is configured to process each of the at least one image so as to extract an identifying characteristic of the travel accommodation, to convert the identifying characteristic extracted from the image to text and to correlate the text to at least one searchable text keyword using a thesaurus. The output module is configured, for the at least one searchable text keyword extracted from an image related to a travel accommodation, to store the link or association between the travel accommodation, the image and the text in a database. This semantic feeder apparatus presents the advantage of exploiting a rich and detailed source of information associated to travel accommodation, i.e., images related to travel accommodation, to complete a description of travel accommodation, since the images may reveal characteristics of the travel accommodation that may not be present in the text description of the travel accommodation.

According to an embodiment of the invention, the system may perform a search of travel accommodation based on criteria entered by a user is provided. The system further includes a semantic feeder database for storing data output by the output module and at least one client device comprising a user interface. A client device may be connected via a network to the semantic feeder database. The system is arranged for receiving a user request comprising travel accommodation-specific criteria via the user interface, searching the semantic feeder database for searchable text keywords matching the criteria in the request and for causing a list of travel accommodation represented by the searchable text keywords to be displayed on the user interface. The coupling of a search platform for travel accommodation to a semantic feeder apparatus presents the advantage of improving the efficiency of a computer-based search. The semantic feeder apparatus enriches the database of the search platform with searchable text keywords corresponding to detailed information extracted from images related to the travel accommodation. It can be easily understood that a computer-based search of a specific type of travel accommodation will be more effective in such a system. The system may include a search-reporting component, which may comprise a database and a module configured for generating reports. The database may be configured to store travel accommodation-specific criteria specified by a user for searching a second database of image-related text keywords and, for each set of search criteria, to store a number of search results. The module may be configured to generate reports comprising the searches performed over a predetermined period of time. At least one report may be based on the number of results output from searches over the predetermined period of time and may concern missing content in the images related to the travel accommodation.

The generated reports may reveal search preferences of users and may also disclose content that is lacking in the images related to a given travel accommodation, and can be used for machine-learning purposes in order to self-enrich the database. The system may be configured to activate the semantic feeder apparatus during at least one of: (i) a time of a new image being made available in a data source, (ii) a time of a new user request, and (iii) a predetermined timing. The choice of when to activate the semantic feeder apparatus may provide an additional flexibility to the system. The system may be arranged to perform a search of hotel properties. The semantic feeder database may store data related to hotels and the semantic feeder apparatus may be configured to be in direct communication with at least one hotel reservation system. The system may be configured, prior to the activation of the semantic feeder apparatus, to update the hotel data stored in the semantic feeder database with hotel data stored in at least one database of the hotel reservation system, and, for each hotel property, to store a pointer in the semantic feeder database to the hotel description in the hotel reservation system. Typically, hotel reservation systems only allow standardized search queries based on simple search criteria such as the location, the hotel category and the room type. Such standardization usually leads to a large number of results matching the search criteria. The coupling of a semantic feeder apparatus to a hotel reservation system optimizes the search of hotel properties, since the semantic feeder apparatus provides an additional source of data concerning the hotels, i.e., information extracted from images related to the hotels. The standard text description of the hotel, which is usually entered by an administrator of the hotel reservation system when the hotel property is created in the database of the hotel reservation system, may even be empty, and the present embodiment may be used to populate the database of the hotel reservation system. The system may further include a data quality reporting component, comprising means to determine the data fields that are common to the semantic feeder database and the hotel reservation system database, means to compare, for every data field that is common to the semantic feeder database and the hotel reservation system database, the value in both databases, means to quantify the compatibility of said values, means to generate a report on the compatibility of said values, and means to raise alerts in the case of discrepancies between said values. This makes it possible to check the accuracy and compatibility of the structured data available in the hotel reservation system and the data gathered by the semantic feeder. For the data fields common to the database of the hotel reservation system and the semantic feeder database, the matching of the data values is measured and reported, and, in case of important discrepancies, alerts are raised to the administrator of the system. The system may further include means to delete, for a data field that is common to the semantic feeder database and the hotel reservation system database, the data from the semantic feeder database if it is not compatible with the data in the hotel reservation database. Data generated by the semantic feeder apparatus may be automatically removed from the semantic feeder database in case they are contradictory with the data available in the hotel reservation system, with the goal to keep the integrity of structured data from the hotel reservation system. The system may further include means to determine the priority of either the database of the hotel reservation system or the semantic feeder database regarding a data field common to both databases and means to direct the user request to the prioritized database. The system may detect irrelevancies in the structured data of the hotel reservation system, in which case the data gathered by the semantic feeder may take over the structured data available in the hotel reservation system.

According to an embodiment of the invention, a computer network-based method for extracting data from images related to travel accommodation is provided. The method includes querying, for each travel accommodation, at least one data source comprising images associated with the travel accommodation and collecting at least one image related to the travel accommodation; processing the at least one image related to the travel accommodation so as to extract an identifying characteristic of the travel accommodation, converting the identifying characteristic extracted from the image to text and correlating the text to at least one searchable text keyword using a thesaurus; and storing, for the at least one searchable text keyword extracted from an image related to a travel accommodation, the association between the travel accommodation, the image and the text, the storage being done in a semantic feeder database associated with the travel accommodation. By exploiting images related to a travel accommodation, the method enriches and completes the description of the travel accommodation since the images may reveal characteristics of the travel accommodation that are not present in its text description.

The method may further include receiving a user request comprising accommodation-specific criteria via a user interface, searching the semantic feeder database for searchable text keywords matching the criteria in the request and displaying the accommodation represented by the searchable text keywords on the user interface. Generally, a computer-based search of travel accommodation based on free, semantic criteria will be more effective after the standard text descriptions of the travel accommodation have been completed with searchable text keywords extracted from images related to the travel accommodation.

The method may further include performing a search report. This may include storing, in a first database, accommodation-specific criteria specified by a user for searching a second database of image-related text keywords and, for each set of search criteria, storing a number of search results. It may further include generating reports concerning the searches performed over a predetermined period of time, wherein at least one report is based on the number of results output from searches over the predetermined period of time and concerns missing content in the images related to the accommodation.

The generated reports may reveal search preferences of users and may also disclose content that is lacking in the images related to a given accommodation, and can be used for machine-learning purposes in order for the computer to self-enrich the database.

The method may further include data quality reporting. It may include determining, for a given hotel reservation system, the data fields that are common to the semantic feeder database and the hotel reservation system database, comparing, for every data field that is common to the semantic feeder database and the hotel reservation system database, the value in both databases, quantifying the compatibility of said values, to generate a report on the compatibility of said values, and raising alerts in the case of discrepancies between said values. This makes it possible to check the accuracy and compatibility of the structured data available in the hotel reservation system and the data gathered by the semantic feeder. For the data fields common to the database of the hotel reservation system and the semantic feeder database, the matching of the data values is measured and reported, and, in case of important discrepancies, alerts are raised to the administrator of the system. The method may further include deleting, for a data field that is common to the semantic feeder database and the hotel reservation system database, the data from the semantic feeder database if it is not compatible with the data in the hotel reservation database. Data generated by the semantic feeder apparatus may be automatically removed from the semantic feeder database in case they are contradictory with the data available in the hotel reservation system, with the goal to keep the integrity of structured data from the hotel reservation system. The method may further include determining the priority of either the database of the hotel reservation system or the semantic feeder database regarding a data field common to both databases and directing the user request to the prioritized database. The system may detect irrelevancies in the structured data of the hotel reservation system, in which case the data gathered by the semantic feeder may take over the structured data available in the hotel reservation system.

According to another aspect of the provided, a computer program product for executing the methods presented above is provided.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, that are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
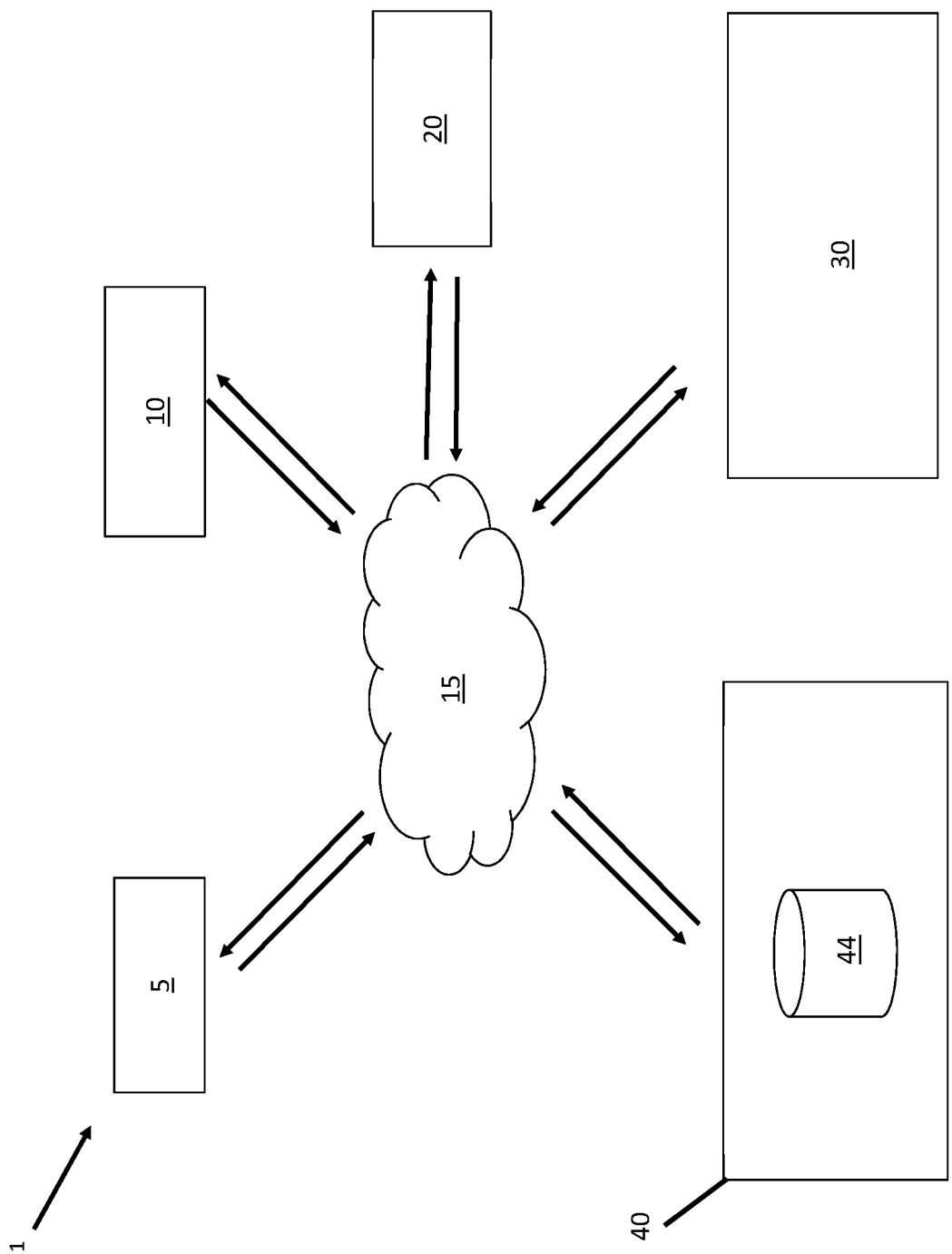
FIG. 1 is a diagrammatic view of an exemplary operating environment for performing a hotel search, including a hotel semantic search system.

Referring now to FIG. 1, an operating environment 1 in accordance with an embodiment of the invention includes a hotel semantic search system 30, a hotel reservation system 40, one or more hotel data sources 20, a travel agency (TA) system 10, in communication via a network 15, and may include or be connected (e.g. via a network 15) to one or more client devices 5. A client device 5 may be any electronic device having a screen, a network access and a way to input data. Representative client devices may include a computer system such as a desktop computer or, alternatively, a mobile electronic device such as a notebook, a laptop computer, a tablet computer, a cellular telephone, a smartphone, a connected watch, etc. A TA system 10 may contain travel data and be connected to various reservation systems, for example a hotel reservation system 40. The hotel reservation system 40 includes a hotel database 44 containing hotel data. The TA system 10 may provide travel agents with an interface for accessing the hotel reservation system 40 that enables agents to search for and book hotels. The TA system 10 may include an application accessible by the client devices 5 enabling travelers to search for and book a hotel, without the help of a travel agent. This application may comprise, for example, a hotel-related website, accessible over the network 15. The TA system 10 may be connected to a hotel semantic search system 30, which is also connected to the hotel reservation system 40. A hotel data source 20 may be any source of images of hotels, including an Online Travel Agency (OLTA) website, a TA website, a provider website such as a the website of a specific hotel or of a chain of hotels, a hotel reservation platform 40, a travel blog, a travel aggregator website or a private database of pictures. One can also imagine a configuration wherein a hotel reservation system 40 is accessed directly, without passing through a TA system 10, through a dedicated application accessible by the client devices 5 enabling travelers to search for and book a hotel, and wherein this hotel reservation system 40 is connected to a hotel semantic search system 30. In another embodiment, a hotel semantic search system 30 may be integrated in a hotel reservation system 40.

Figure 2:
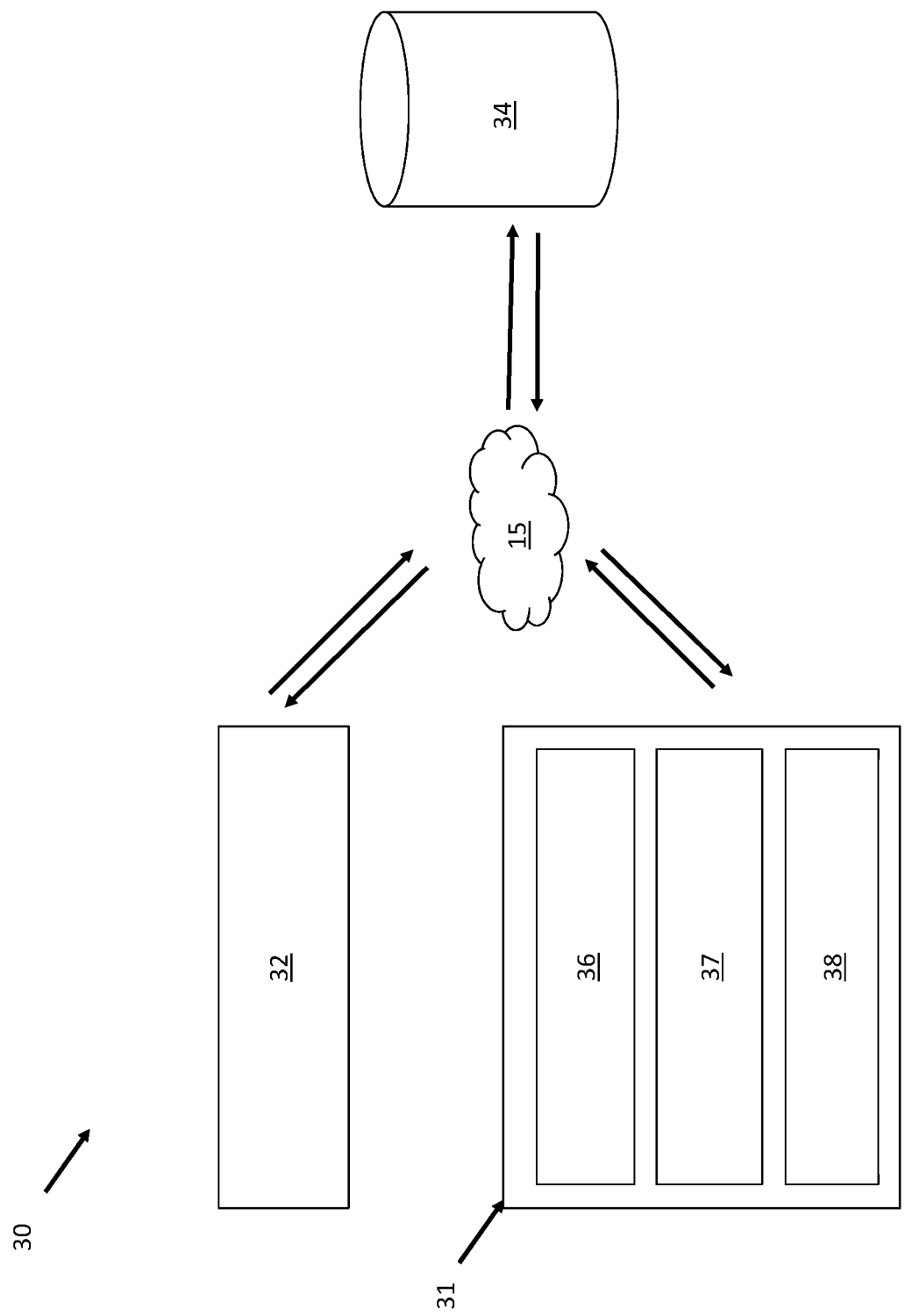
FIG. 2 is a diagrammatic view of the components of a hotel semantic search system.

Referring now to FIG. 2, a hotel semantic search system 30 includes a hotel semantic feeder apparatus 31, a hotel semantic search engine 32 and a hotel semantic feeder database 34. The hotel semantic search system 30 has access to various hotel data sources 20 over the network, as shown on FIG. 1. A hotel semantic feeder apparatus 31 includes an image collector module 36, an image processor module 37 and an output module 38. The hotel semantic feeder apparatus 31 feeds the hotel semantic feeder database 34 in real time or on a regular basis, for example once a week, with searchable text keywords representing one or more identifying characteristics of the hotels obtained, as explained in further detail with respect to FIG. 3, from a semantic analysis of pictures related to the hotels. The hotel semantic feeder database 34 contains a reference table with a list of hotel data sources 20 to crawl. These may include URLs of websites or addresses of private databases. The image collector module will crawl these hotel data sources 20 at a frequency defined in the hotel semantic feeder apparatus 31. The frequency is determined by rules with the following criteria: the estimated number of updates since the last crawling, a forced frequency for a given source, the geographical area, and the time period of the year. The frequency may be once a day or once a week during busy holiday periods; or once a month or less during off-peak times, for example. The hotel semantic feeder apparatus 31 may also be triggered explicitly, for example by an administrator of the hotel reservation system 40 or by an update on the hotel data source 20, for example via a Web service. For each image that is collected, the image collector module 36 will store a reference to the image and the identifier of the related hotel in the hotel semantic feeder system 30, and subsequently call the image processor module 37. The image processor module 37 will caption the image, i.e., it will extract keywords and pieces of sentences describing the image and the elements present in the image (see below for examples of how this is done), consult a thesaurus in the hotel semantic feeder database 34 to determine one or more categories that correspond to the content of the image, and then call the output module 38. The output module 38 will store the list of all the words that have been extracted from the image by the image processor module 37 in the hotel semantic feeder database 34.

Figure 3:
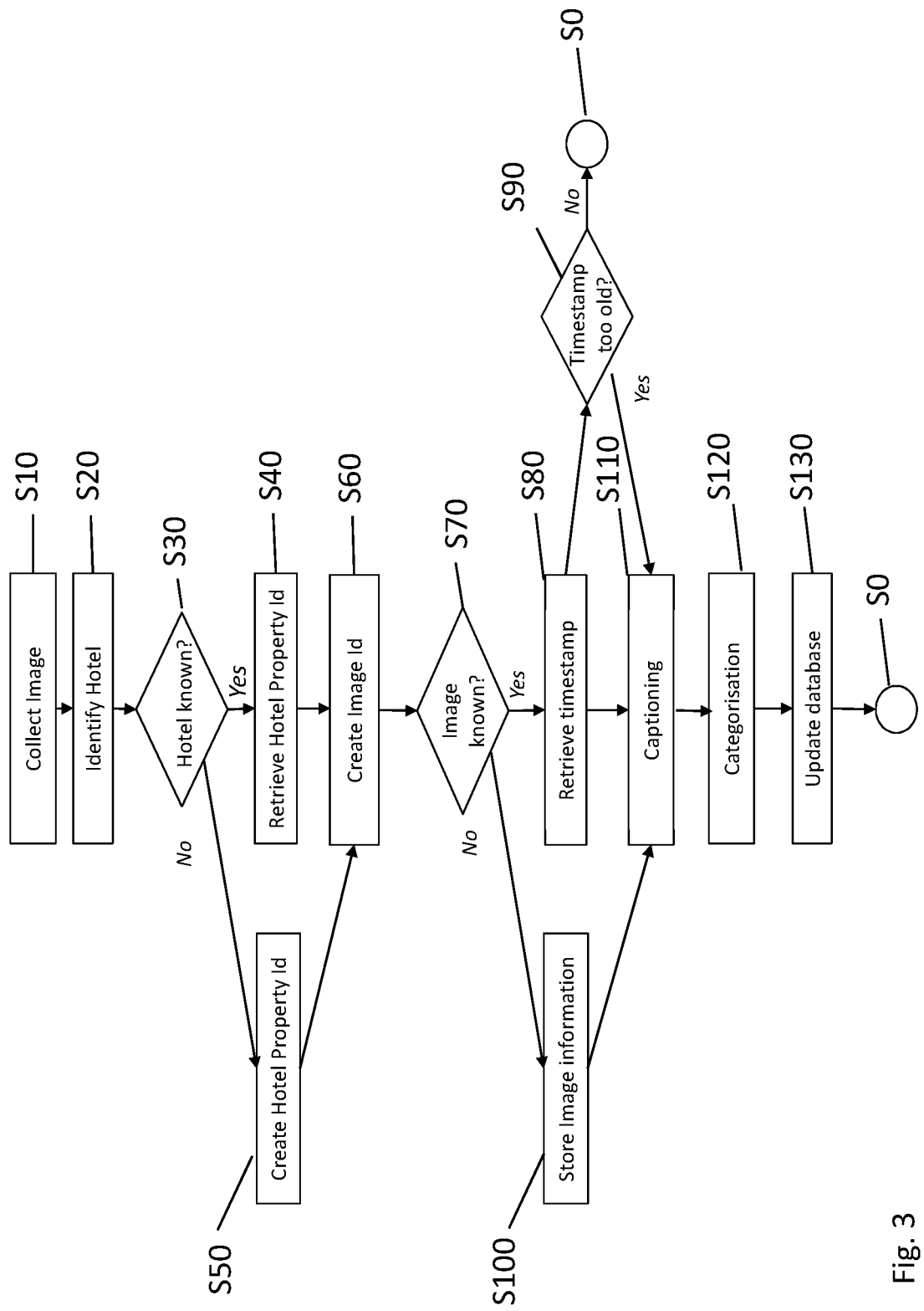
FIG. 3 is a flowchart describing the process performed by a hotel semantic feeder apparatus as part of a hotel semantic search system as shown on FIG. 2.
Figure 8:
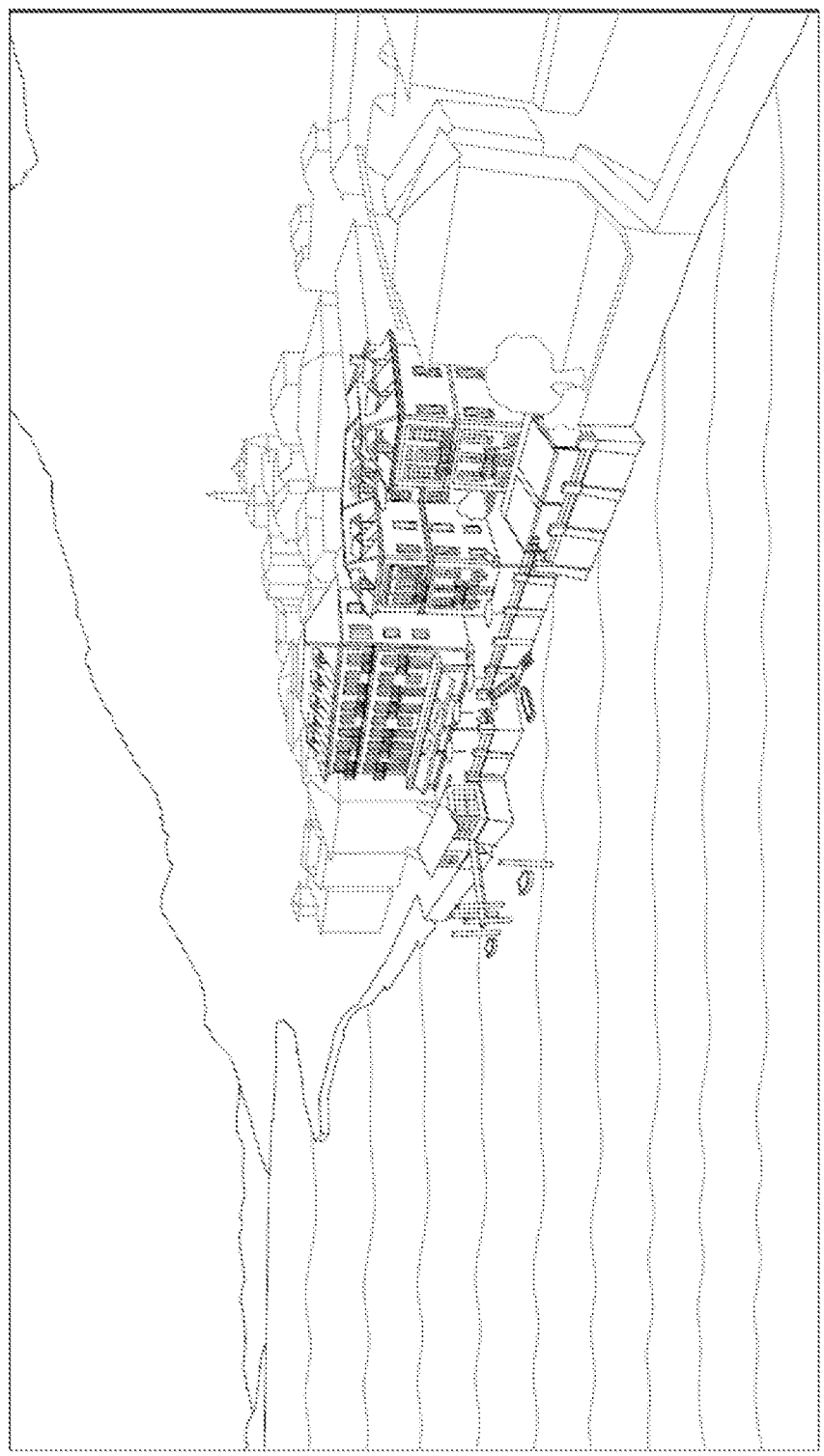
FIG. 8 is a drawing of a sample image.

In FIG. 3, an exemplary working of a hotel semantic feeder apparatus 31 is described in further detail by means of a flowchart with the actions that are executed after an image has been collected at a hotel data source 20. Suppose that image A, illustrated in FIG. 8, is collected on TripAdvisor® (S10). First, the image collector module 36 gathers information allowing the identification of the hotel (S20) relating to image A, such as the name of the hotel, the address, the GPS coordinates, the phone numbers, etc. The hotel identification may be present in the hotel data source 20, for example when the hotel data source 20 is a private database. The hotel information may also be gathered from the website where the picture has been found. If the hotel name is not found on the page, it can be retrieved indirectly from information gathered from the page, such as its address, phone number or GPS coordinates. In this case, the identification process can be done by external modules. On TripAdvisor® for example, the name and address data are present in the webpage containing the picture and can be retrieved by screen scraping. Screen scraping techniques include capturing the bitmap data from the screen and running it through an optical character recognition engine. For image A, the retrieved hotel data is: Hotel Cannero, Piazza Umberto Primo 2, 28821 Cannero Riviera, Italy. With the gathered identifiers, the image collector module 36 queries the hotel semantic feeder database 34 to determine if the hotel property is known by the hotel semantic feeder database 34 (S30). If so, the Hotel Property Identifier (Hotel Property Id) of the hotel property is retrieved (S40); if not, a unique Hotel Property Id is created (S50). In the next block, a unique Image Id is generated, for example based on image hashing (S60) and, with this Image Id, the hotel semantic feeder database 34 is queried (S70). If the image is known (the Image Id or image hash exists already in the database), its timestamp is retrieved from the hotel semantic feeder database 34 (S80) and checked (S90). If the timestamp is too old, the old timestamp is replaced by the new timestamp and the image processor module 37 is called (S110); if the timestamp is not too old, the process is finished for this image (S0), and the hotel semantic feeder apparatus 31 can move on to another image. The minimum timestamp to which a collected image has to correspond can be configured in the hotel semantic feeder apparatus 31. The timestamp is used to determine whether the image should be reprocessed. The algorithms used by the image processor module 37 are mostly based on machine learning and neural networks, and their accuracy improves continuously, so it may be worth reprocessing a same image if the previous processing was a long while ago. Let's suppose that Hotel Cannero is known in the hotel semantic feeder database 34. The image collector module 36 retrieves the Hotel Property Id ABC676A&DD from the Hotel Property record in the hotel semantic feeder database 34 (S50) (which also contains data identifying the hotel such as its name and address) and generates a unique Image Id for the hotel image (S60), for example based on image hashing, as well as a timestamp, and associates these to the Hotel Property Id. For image A, it generates a unique Image Id 12345678 (S60), and checks in the hotel semantic feeder database 34 if the image is known (S70). If the image is not known, which in our example is the case for image A, the image collector module 36 stores the following information in the hotel semantic feeder database 34 (S100):

| Hotel Property Id | Image Id | Image URL | Timestamp |
|---|---|---|---|
| ABC676A&DD | 12345678 | https://www.tripadvisor.fr/Hotel_Review_Hotel_Cannero_picture1.html | 2501201714011111 |

For performance purposes, the image itself may be stored as well.

Subsequently, the image processor module 37 is called. The image processor module 37 is in charge of the automatic captioning of the images gathered by the image collector module 36 (S110). Captioning an image consists of extracting keywords and pieces of sentences describing the image and the elements present in the image. This is done by a pattern recognition algorithm based on neural networks. In the publications "Show and Tell: A Neural Image Caption Generator" by Oriol Vinyals, Alexander Toshev, Samy Bengio and Dumitri Erhan published by Cornell University Library as version 1 on Nov. 17, 2014 and as version 2 on Apr. 20, 2015 (which are hereby incorporated by reference herein in their entirety for all purposes), a possible implementation of such an algorithm is explained. Based on a set of independent training images, the algorithm learns to recognize features such as sea, pool, mountain, castle, old town, high buildings, motorway, and so on. For a given image, the algorithm searches the patterns corresponding to these features. It may find several, allowing the definition of relationships such as "close to", "on the border of", "with view of", etc. The more images are processed, the better the algorithm works. For image A, extracted words might include: lake, mountains, blue, green, meridional house, italian style, red roof. Pieces of sentence may typically include: traditional meridional building on the shore of a lake with mountain background, traditional meridional house in the mountains by a lake.

The image caption (of the captioning block S110) is the list of all the words and pieces of sentence extracted from the image. The image recognition algorithms used by the image processor module 37 are trained to focus on travel-oriented words. For example, in another context, trained differently, the same algorithms would also have recognized "sky, trees, buildings, water" on image A. A second process occurs in the image processor module 37: the categorization (S120). Categorization is based on algorithms with a mixed approach of non-supervised and supervised learning. The images are clustered based on the colors and the captions. Images with cold colors and/or with a caption such as "lounge with computer desk", for example, will be clustered as "business travel" whereas the image given in the example above will more likely be clustered as "leisure travel". Clustering relies on a pre-defined set of categories (business travel, leisure travel, sea, lake, mountain, traditional architecture, modern architecture) referring to major travel trends on a market. These categories are stored in a thesaurus in hotel semantic feeder database 34, may evolve over time, and may be different according to the geographical area, the language, the client application etc. This part is a configurable aspect allowing the customization and specialization of the hotel semantic feeder apparatus 31. For each image, the output module 38 stores the caption and the timestamp of the captioning in the hotel semantic feeder database 34 as well as the categorization and the categorization timestamp (S130), thus establishing an association between searchable text keywords and a particular hotel. For image A:

| Image Id | Captioning Timestamp | Caption |
|---|---|---|
| 12345678 | 25012017150122222 | lake, mountains, blue, green, meridional house, italian style, red roof, traditional meridional building on the shore of a lake with mountain background, traditional meridional house in the mountains by a lake |

| Image Id | Categorization timestamp | Categories |
|---|---|---|
| 12345678 | 25012017150133333 | water, mountains, nature, leisure travel, traditional architecture |

The process for image A has now finished and the hotel semantic feeder apparatus 31 can move on to a next image.

Figure 4:
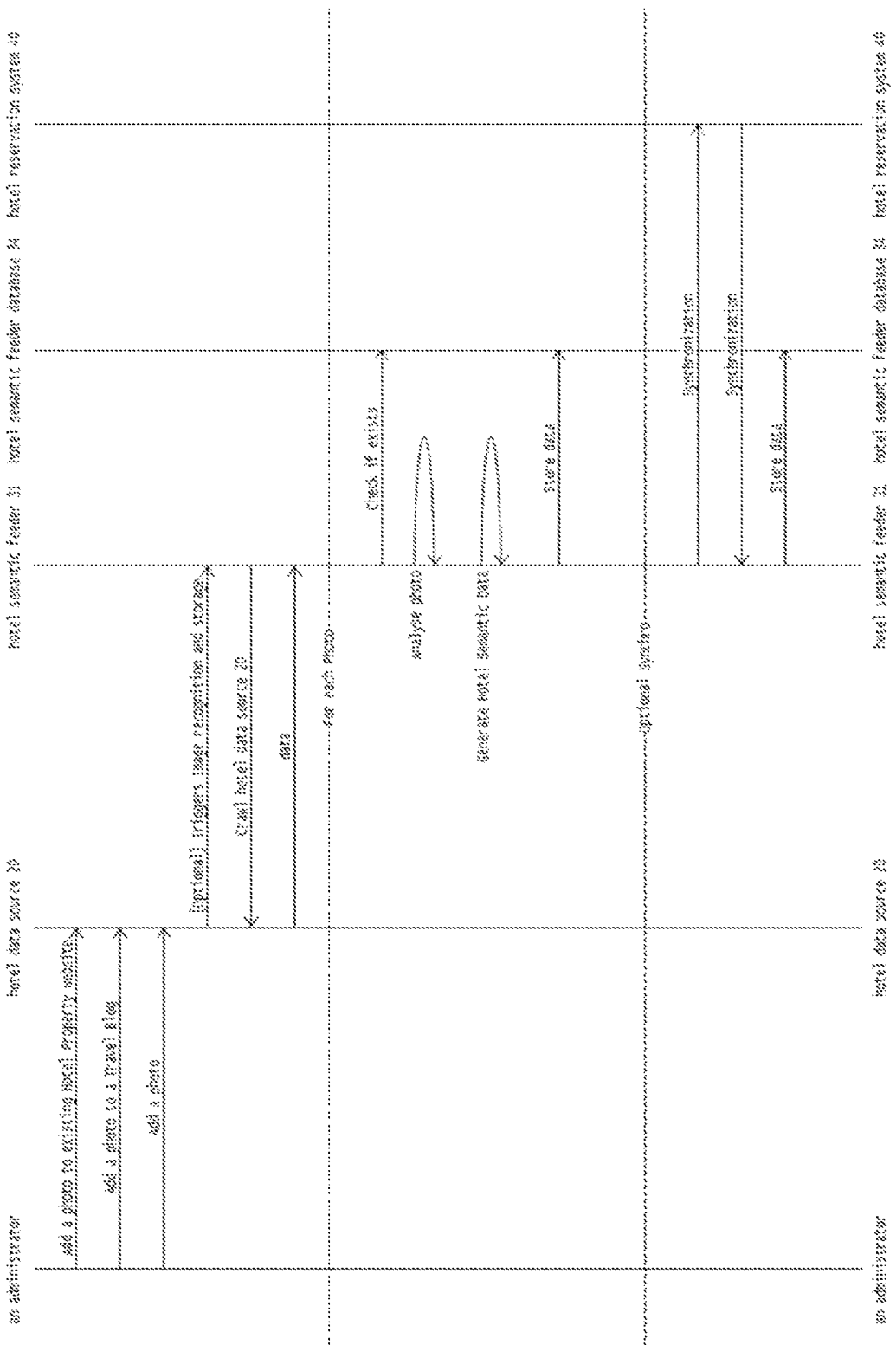
FIG. 4 is a sequence diagram illustrating the communication between a hotel semantic feeder apparatus and the various components in its operational environment as shown on FIG. 1 and FIG. 2 while executing the process described in FIG. 3.

FIG. 4 illustrates the communication between the hotel semantic feeder apparatus 31 and the various components in its operational environment as shown on FIG. 1 while executing the process described above. In this context, an administrator is a person or a process in charge of updating the hotel data source 20 by adding or removing pictures. A user of TripAdvisor® may for example add an image of a hotel referenced by TripAdvisor® to the TripAdvisor® website or a hotel owner may add a photo to an existing hotel website. In one embodiment of the invention, a storage of a picture by an administrator in a hotel data source 20 triggers the activation of the hotel semantic feeder apparatus 31. The hotel semantic feeder apparatus 31 can also be configured to be activated at regular times, e.g., every Monday at 10 am. Let's consider an example where the hotel semantic feeder apparatus 31 is activated in real time. The hotel semantic feeder apparatus 31 listens by means of an API such as Web Service to various hotel data sources 20 including, amongst others, TripAdvisor®. On TripAdvisor®, a traveler is uploading image A. Discovering that a new image has been added to TripAdvisor®, the hotel semantic feeder apparatus 31 activates the image collector module 36. The image collector module 36 collects image A and the data identifying the hotel image A is related to (such as the name of the hotel and its address) and checks, based on the hotel identifying data, if the hotel exists in the hotel semantic feeder database 34. In our example, hotel Cannero exists in the hotel semantic feeder database 34 and its unique Hotel Property Id is found and retrieved. The image collector module 36 then generates an Image Id and timestamp for image A, and checks if image A is known in the hotel semantic feeder database 34. Because image A is not known, the image collector module 36 stores its Id, address and timestamp in the hotel semantic feeder database 34 and calls the image processor module 37. The image processor module 37 performs image-recognition algorithms on image A, captioning the image, i.e., generating keywords defining features visualized on the picture that are related to the hotel and to the travel sector. The obtained caption is a list of word expressions, and may in the case of image A be: lake, mountains, blue, green, meridional house, italian style, red roof, traditional meridional building on the shore of a lake with mountain background, traditional meridional house in the mountains by a lake. The image processor module 37 also performs a categorization based on the captions and colors of the image, as explained previously. The output module 38 stores the caption and the timestamp of the captioning in the hotel semantic feeder database 34, as well as the categorization and the categorization timestamp.

In one embodiment of the invention, the hotel semantic feeder apparatus 31 communicates with a hotel reservation system 40. Before being activated, the hotel semantic feeder apparatus 31 may first synchronize the hotel semantic feeder database 34 with the hotel database 44 of the hotel reservation system 40 by checking if the properties contained in the hotel database 44 correspond to the ones in the hotel semantic feeder database 34 and creating and/or eliminating records in the hotel semantic feeder database 34 if necessary. Taking again the example of Hotel Cannero, we may consider a scenario with Hotel Cannero existing in the hotel reservation system 40 and, apart from its identifying data, being described by the following elements in the hotel database 44: 4 star—lakeside resort—60 rooms—restaurant—tennis—swimming pool—Lago Maggiore—Italy. Suppose that Hotel Cannero does not exist in the hotel semantic feeder database 34. At synchronization time, based on identifying hotel data such as the name of the hotel ("Hotel Cannero"), no Hotel Property Id is found in the hotel semantic feeder database 34. A unique Hotel Property Id is created in hotel semantic feeder database 34 and the data identifying Hotel Cannero (retrieved from the hotel database 44) are stored, as well as a pointer to Hotel Cannero in the hotel reservation system 40. When the semantic feeder apparatus 31 is subsequently activated, it will crawl data sources 20 for images related to Hotel Cannero. In one embodiment of the invention, the hotel semantic feeder apparatus 31 is integrated in a hotel reservation system 40 and the hotel semantic feeder database 34 and the hotel database 44 are merged.

In a particular implementation, the hotel semantic search system 30 completes existing, structured data available in the hotel reservation system 40. It is known that hotel reservation system data is often input manually by an administrator handling catalogues of hundreds of hotels or by automatic processes translating data from one system categorization to another one in best-effort mode, leading to a significant loss of data. As a consequence, the amount of information available for each hotel in the hotel reservation system 40 is often reduced to a minimal set of common data. Data gathered by the semantic feeder apparatus 31 can automatically add information which is specific to a single hotel or to a limited number of hotels, in the case of Hotel Cannero: "located in a traditional village on the shore of a lake with mountain background".

In a particular implementation, the hotel semantic search system 30 provides reporting about the data quality between the structured data available in the hotel reservation system 40 and the data gathered by the semantic feeder apparatus 31. For each data field type which is common between the hotel database 44 and the hotel semantic feeder database 34, reports may be generated periodically measuring the matching of the data values. The compatibility of the data values may be quantified. In this particular implementation, the semantic feeder database has extra fields, i.e., the same fields as the hotel database and it tries to fill them with the caption and categories of the images relating to the hotel. Common fields can be compared, for example using a thesaurus that associates text with keywords and a reference table that gives a compatibility value between different keywords. The compatibility value corresponds to a score between 0 and 10.

Considering a field "location", the following use-cases may occur:

Example 1

| Hotel database | Location | "Lago Maggiore"(*) |
| Semantic feeder database | Location | "on the shore of a lake" |

(*)lago is Italian for lake

The more specific term Lago Maggiore is to the keyword "lake" in the thesaurus and subsequently the semantic feeder database value "on the shore of a lake" is compared to "lake" using a reference table. The compatibility value (as extracted from a reference table) is 10.

Example 2

| Hotel database | Location | "Lago Maggiore" |
| Semantic feeder database | Location | "water" |

Lago Maggiore is matched to the keyword "lake" in the thesaurus and subsequently the semantic feeder database value "water" is compared to "lake". The compatibility value (as extracted from a reference table) is 8.

Example 3

| Hotel database | Location | "Lago Maggiore" |
| Semantic feeder database | Location | "desert" |

Lago Maggiore is matched to the keyword "lake" in the thesaurus and subsequently the semantic feeder database value "desert" is compared to "lake". The compatibility value (as extracted from a reference table) is 0.

This is a possible implementation of the quantification of compatibility of data values, and the person skilled in the art will understand that various other implementations are possible.

A report may be generated listing data fields with bad compatibility values. The administrator may be able to set a compatibility threshold, i.e., a maximum level allowed for discrepancies, for example compatibility value 5. If the compatibility threshold is crossed, an alert (such as an e-mail or other electronic alert) may be raised to the administrator, so that he can undertake immediate action, for example by adapting the structured data, by deleting pictures in the picture gallery of the hotel reservation system 40 or by blacklisting a specific data source 20 providing misleading images.

In a particular implementation, data in the hotel semantic feeder database 34 can supersede the structured data available in the hotel database 44. An algorithm moderates the priority of each field from the hotel database 44 against a value computed after each successful search in the data gathered by the hotel semantic feeder apparatus 31 and stored in the hotel semantic feeder database 34. As an example, if the hotel database 44 does not contain swimming pool information regarding Hotel A, the information gathered from the semantic feeder apparatus 31 "Swimming pool exists in this hotel" will supersede the information stored in the hotel reservation system 40, and Hotel A will be shown as a hotel with a swimming pool. The priority switch for the "swimming pool" data from the hotel database 44 to the hotel semantic feeder database 34 is done after several successful searches of "Hotel with swimming pool" among hotel pictures leading to Hotel A as result, and after several bookings of Hotel A in the hotel reservation system 40.

In a particular implementation, the hotel semantic feeder apparatus 31 will automatically remove the generated data in case it is contradictory with data available in the hotel reservation system 40, with the goal being to keep the integrity of structured data from the hotel reservation system 40. The hotel semantic feeder apparatus 31 may also blacklist some picture sources which generate too many discrepancies with the hotel reservation system 40. Black-listing will apply not only for the hotels where the discrepancies were detected, but also to a set of hotels, for example based on geographical criteria, where the data gathered by the semantic feeder apparatus 31 will be considered as not trustworthy or reliable.

The behaviors described above can be configured and tuned separately depending on the source of the pictures used by the semantic feeder apparatus 31. The semantic feeder apparatus 31 can compute recommendations about the reliability of each data source 20 depending on the level of quality of data aggregated at the data source 20 over the time.

Figure 5:
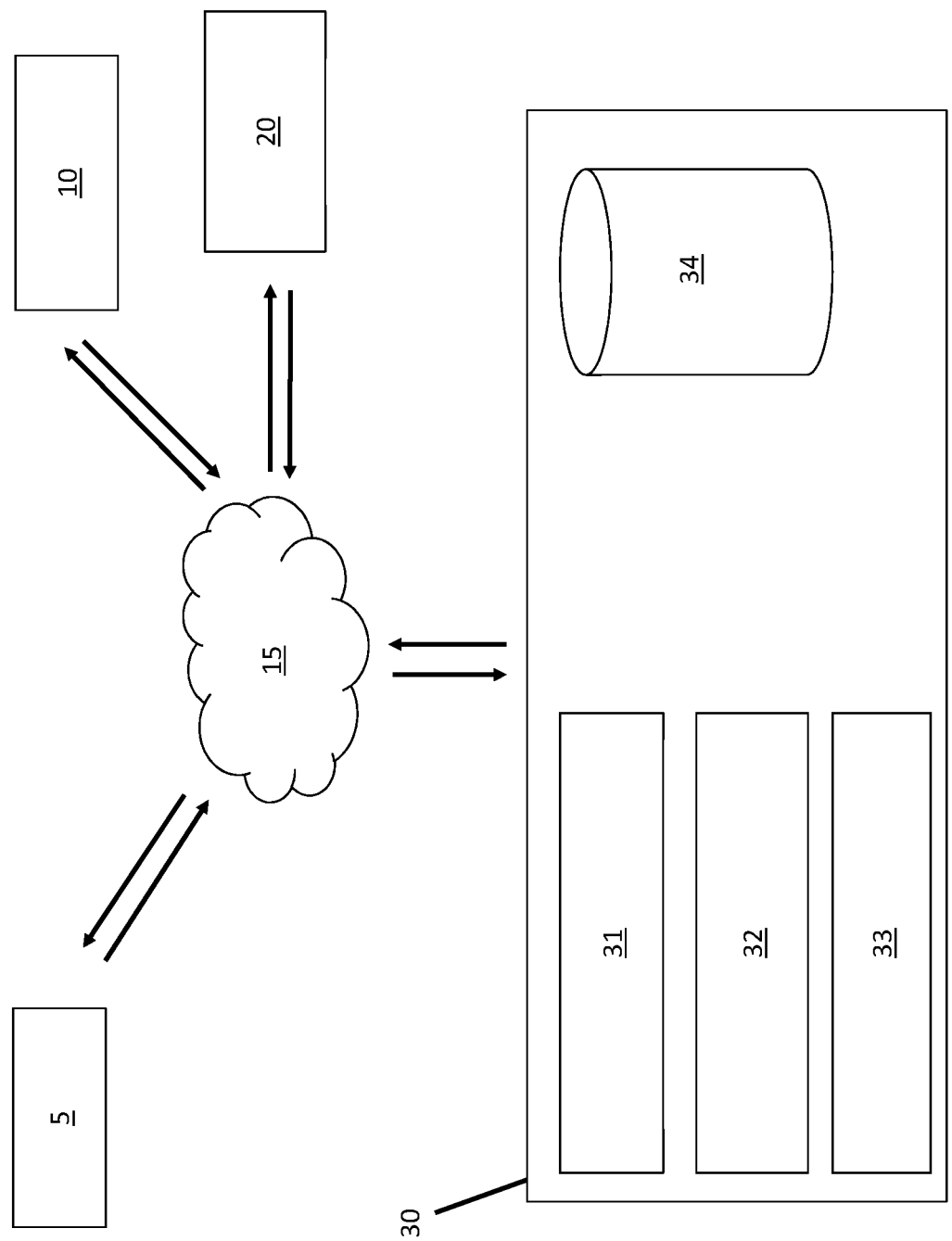
FIG. 5 is a diagrammatic view of a semantic search-reporting component as part of a hotel semantic search system 30 as shown on FIG. 2 and in accordance with an embodiment of the invention.

Referring now to FIG. 5, a hotel semantic search system 30 containing a semantic search reporting component 33 is shown in its operating environment. Other parts of the figure that are described hereinabove are labelled with the same reference numerals. How this component works is explained further below.

Figure 6:
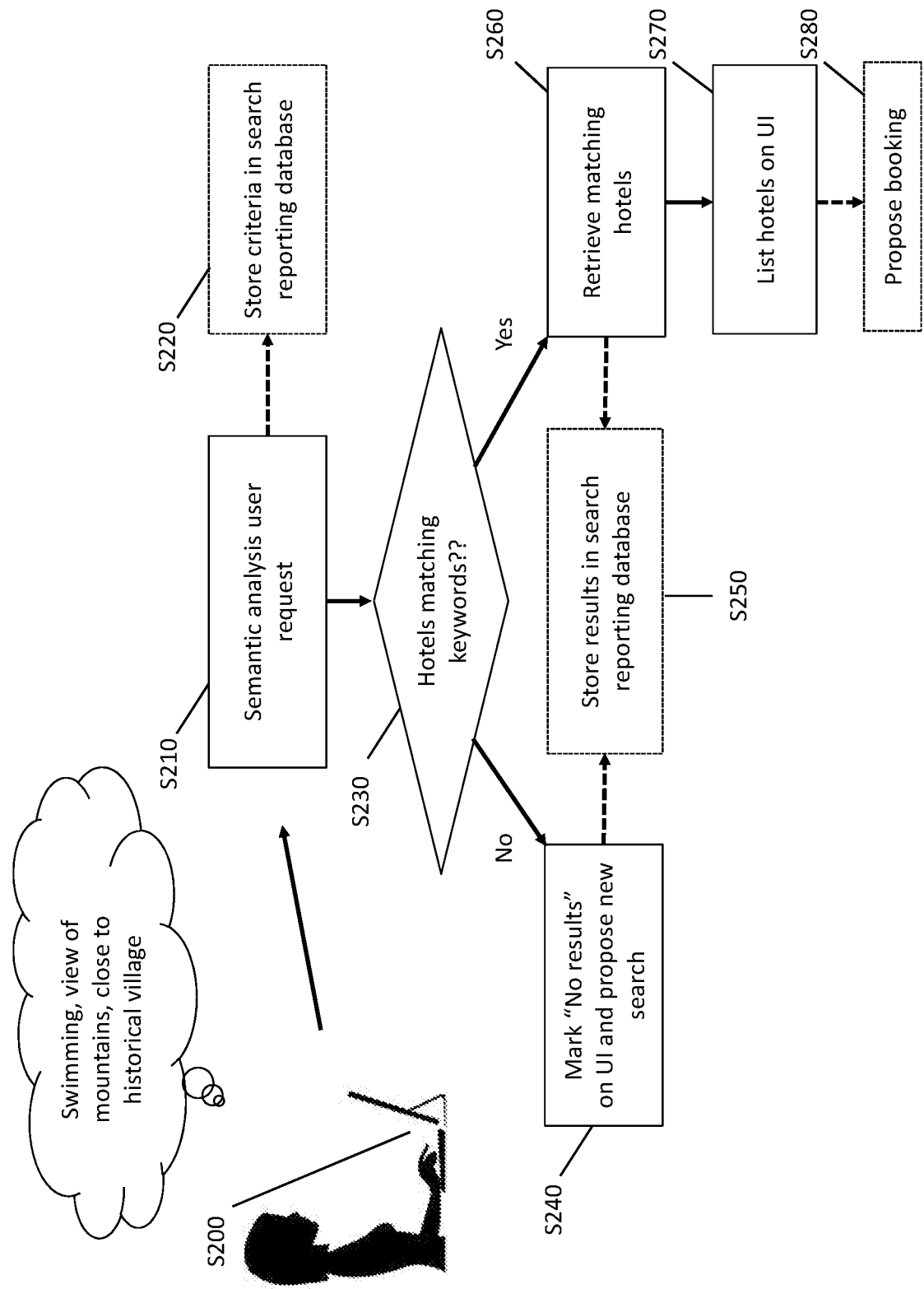
FIG. 6 is a flowchart describing the process performed by a hotel semantic search engine as part of a hotel semantic search system as shown on FIG. 2.

In FIG. 6, an exemplary working of a hotel semantic search engine 32 as shown in FIG. 1 is described in further detail by means of a flowchart with the actions that are executed after a user request for hotel options based on free text has been received. This drawing also features the actions performed by a semantic search reporting component 33 when a user request is received by the hotel semantic search engine 32. Typically, a hotel reservation system 40 allows only standardized search queries based on simple search criteria such as location, hotel category, room types and availabilities. Such standardization usually leads to a large number of results matching the search criteria. For example: "4* hotel in Paris" will return many results. Thanks to the data gathered by semantic feeder apparatus 31, non-standard criteria, not available in the hotel reservation system 40, may lead the travel agent or future traveler to find a suitable hotel, for example by searching from near-by elements of the hotel visible on the hotel pictures such as "4* Hotel in Paris with view on the Seine, the Louvre and the Eiffel tower". Suppose that a traveler is looking for a hotel with swimming facilities, a view of mountains, close to a historical village. We may first consider a scenario with the user inputting his criteria in a search box of a conventional hotel reservation system 40. This hotel database 44 contains Hotel Cannero, described by the following elements: 4 star—lakeside resort—60 rooms—restaurant—tennis—swimming pool—Lago Maggiore—Italy. With the keywords "swimming", ""view of mountains" and "close to historical village", the hotel database 44 is queried. Hotel Cannero is not found as only one criteria "swimming" matches an element in the hotel description ("swimming pool"). We may now consider an operational environment according to the invention. The traveler enters "swimming, view of mountains, close to historical village" (S200) in a search box on a TA website connected to a hotel semantic search system 30. The request is received by the hotel semantic search engine 32, which performs a semantic analysis on the user-specified criteria (S210). Using Natural Language Processing techniques, the hotel semantic search engine 32 maps the criteria entered by the user to predefined keyword categories that are stored in a thesaurus in the hotel semantic feeder database 34. For example, "swimming" to "water", "view of mountains" to "mountains", and "close to a historical village" to "traditional architecture".

The semantic search reporting component 33 generates an Id for the user request and saves the Id and the keywords associated to the user request in its database (S220). With the keywords generated based on the user request, the hotel semantic search engine 32 queries the hotel semantic feeder database 34, looking for hotels with matching categories (S230). If no matches are found, a corresponding message is displayed on the user interface (UI) and the user may be invited to perform a new search (S240). In this example, at least one match is found, since image A has been uploaded by a traveler and is now part of the hotel semantic feeder database 34. Based on the keyword categories "water, mountains, traditional architecture" to which the user request has been mapped, the hotel semantic feeder database 34 is queried. It is found that the keyword categories are part of the categories related to Image Id 12345678. Hotel Cannero, the hotel associated to Image Id 12345678, is retrieved from the hotel semantic feeder database 34 (S260). More generally, all hotels in the hotel semantic feeder database 34 with images having categories corresponding to the categories the user criteria have been mapped to are retrieved from the hotel semantic feeder database 34 (S260). The hotels are listed on the user interface (UI) (S270).

In one embodiment of the invention, the semantic search system 30 is coupled to a hotel reservation system 40, and in the hotel semantic feeder database 34, with each Hotel Property Id a pointer is stored pointing to the corresponding hotel in the hotel database 44. By clicking on a hotel listed on the UI, the user may be redirected to the hotel reservation system 40 and be invited to make a booking (S280).

In another embodiment, a mapping system with more detailed categories for the user criteria and/or the image captions can be used.

In still another embodiment, the hotel semantic search engine 32 may compare keyword categories with captions of hotel images. For each user request that is made, the semantic search reporting component 33 saves the number of found hotels and their Hotel Property Ids in its database (S250). The data gathered by the semantic search reporting component 33 can be used to generate reports revealing content that is lacking in the images related to the travel accommodation. A report describing popular queries for a particular geographic region may be generated and distributed to the administrators of hotels located in the geographic region that were not found based on the popular queries. However, the hotels may be fitting the user criteria, but their description may not contain the user criteria and the images related to the hotels may not feature the criteria. In this case, the administrators may be incited to complete the description of the hotels or add images featuring the popular criteria on the hotel picture galleries. It may also be the case that a hotel in the particular geographic region does not fit the popular user criteria. If so, the reports generated by the semantic search reporting component 33 may enable the hotel property owner to estimate the added revenues if he decides to undertake works so that the hotel fits the popular user criteria. The generated reports may also be used to self-enrich the thesaurus. If many criteria are mapped to the same keyword, then a machine-learning algorithm may create a set of new keywords that are subcategories of the said keyword. This allows the categories to be made more subtle and to be made more accurate in the search. For example, "water" may be have the subcategories "lake", "swimming pool", "pool", "ocean" and "sea".

Figure 7:
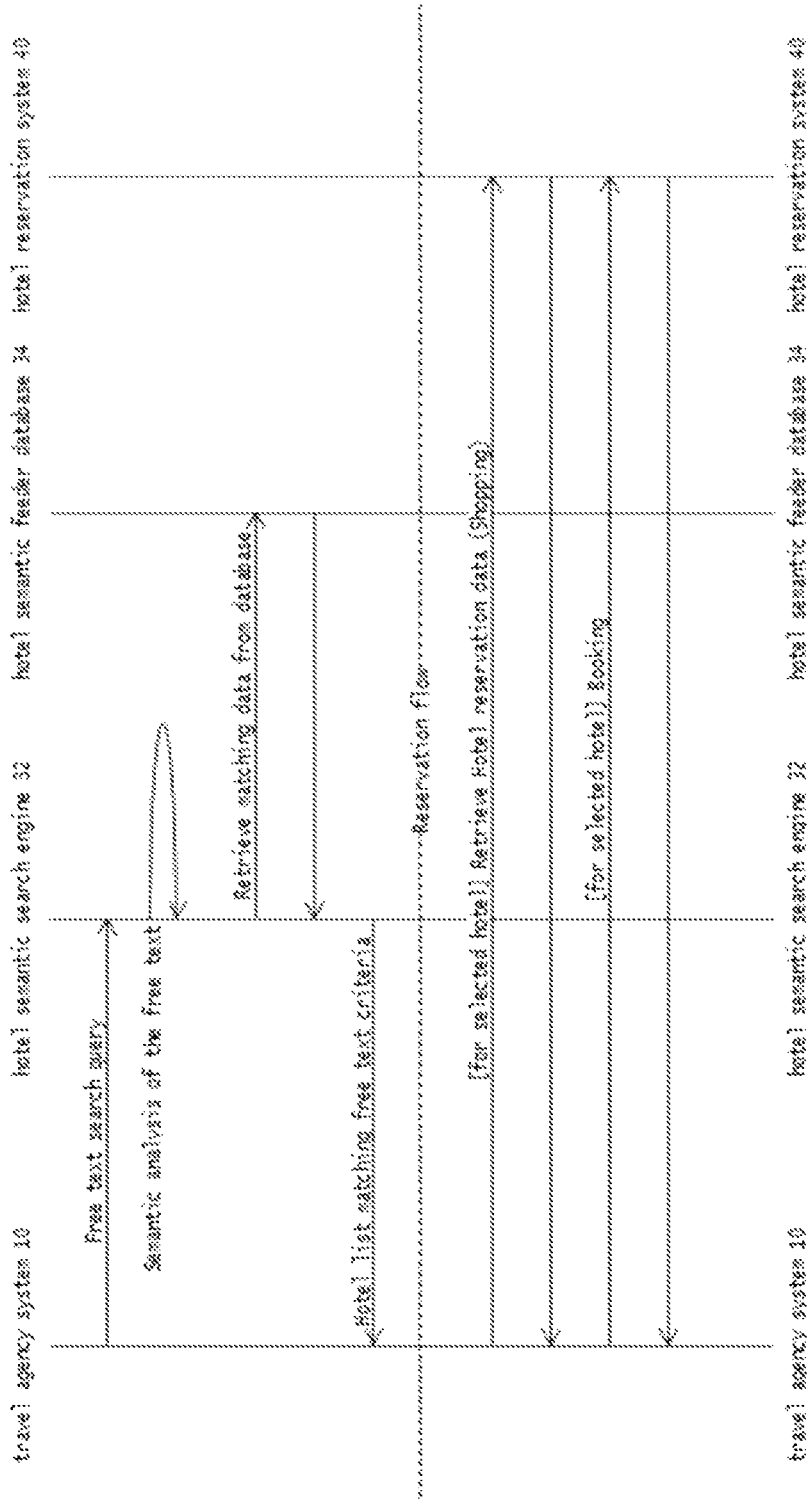
FIG. 7 is a sequence diagram illustrating the communication between a hotel semantic search engine and the various components in its operational environment as shown on FIG. 1 and FIG. 2 while executing the process described in FIG. 6.

FIG. 7 is a sequence diagram illustrating the communication between the hotel semantic search engine 32 and the various components in its operational environment as shown on FIG. 1 while executing the process described above. According to the illustrated embodiment, a user, either a third party reservation agent or a traveler, may use a client device 5 to access the web interface of a TA system 10 and search a hotel. The user may choose not to select predetermined criteria but to input a free text search query, either by entering text in a search panel or by entering a voice message. The TA system 10 sends the user request to a hotel semantic search system 30, where it is received by a hotel semantic search engine 32. The hotel semantic search engine 32 performs a semantic analysis on the user request, mapping the free text as inputted by the user with keywords. The hotel semantic search engine 32 then queries the hotel semantic feeder database 34 with these keywords. Hotels with matching image categories or captions are returned to the hotel semantic search engine 32 as explained in more detail above. The hotel semantic search engine 32 collects the hotel names and the pointers to these hotels in the hotel reservation system 40 from hotel semantic feeder database 34, bundles the gathered information in a list and sends it through the network 15 to the TA system 10, for display on the client device 5. The user views the several hotel options provided by the hotel semantic search system 30 to the TA system 10 and may choose a hotel and perform an availability request, entering a check-in date and a check-out date in the TA system 10. The availability request is sent to the hotel reservation system 40 for the particular hotel selected. The hotel database 44 is queried and returns an availability status for the particular hotel, which is converted into a message and sent to the TA system. If the hotel requested by the user is available on the chosen dates, the user may book the hotel. The booking request is sent to the hotel reservation system 40 and processed.

Figure 9:
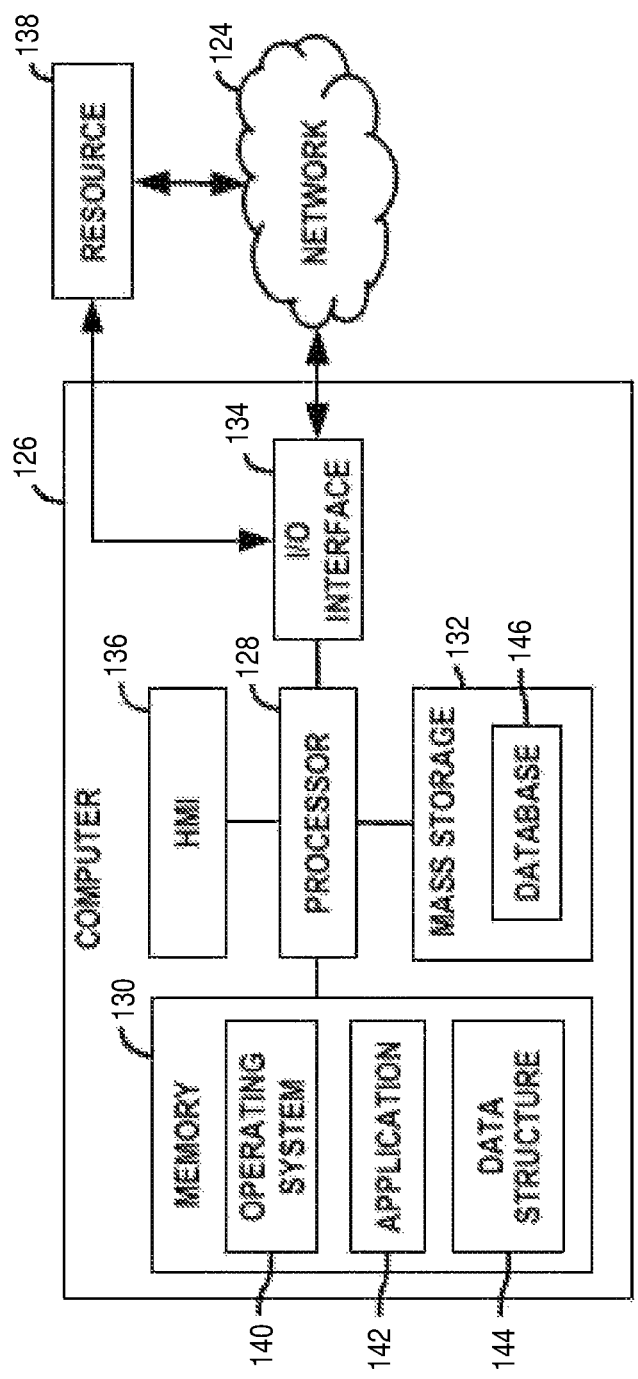
FIG. 9 is a schematic view of an exemplary computer system.

Referring now to FIG. 9, the apparatus, systems, engines, etc. described herein may be implemented on one or more computing devices or systems, such as exemplary computer system 126. The computer system 126 may include one or more processors 128, a memory 130, a mass storage memory device 132, an input/output (I/O) interface 134, and a Human Machine Interface (HMI) 136. The computer system 126 may also be operatively coupled to one or more external resources 138 via the network 122 or I/O interface 134. External resources may include, but are not limited to, servers, databases, mass storage devices, peripheral devices, cloud-based network services, or any other suitable computer resource that may be used by the computer system 126.

The processor 128 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 130. Memory 130 may include a single memory device or a plurality of memory devices including, but not limited, to read-only memory (ROM), random access memory (RAM), volatile memory, non-volatile memory, static random access memory (SRAM), dynamic random access memory (DRAM), flash memory, cache memory, or any other device capable of storing information. The mass storage memory device 132 may include data storage devices such as a hard drive, optical drive, tape drive, non-volatile solid state device, or any other device capable of storing information.

Processor 128 may operate under the control of an operating system 140 that resides in memory 130. The operating system 140 may manage computer resources so that computer program code embodied as one or more computer software applications, such as an application 142 residing in memory 130, may have instructions executed by the processor 128. In an alternative embodiment, the processor 128 may execute the application 142 directly, in which case the operating system 140 may be omitted. One or more data structures 144 may also reside in memory 130, and may be used by the processor 128, operating system 140, or application 142 to store or manipulate data.

The I/O interface 134 may provide a machine interface that operatively couples the processor 128 to other devices and systems, such as the network 122 or external resource 138. The application 142 may thereby work cooperatively with the network 122 or external resource 138 by communicating via the I/O interface 134 to provide the various features, functions, applications, processes, or modules comprising embodiments of the invention. The application 142 may also have program code that is executed by one or more external resources 138, or otherwise rely on functions or signals provided by other system or network components external to the computer system 126. Indeed, given the nearly endless hardware and software configurations possible, persons having ordinary skill in the art will understand that embodiments of the invention may include applications that are located externally to the computer system 126, distributed among multiple computers or other external resources 138, or provided by computing resources (hardware and software) that are provided as a service over the network 122, such as a cloud computing service.

The HMI 136 may be operatively coupled to the processor 128 of computer system 126 in a known manner to allow a user to interact directly with the computer system 126. The HMI 136 may include video or alphanumeric displays, a touch screen, a speaker, and any other suitable audio and visual indicators capable of providing data to the user. The HMI 136 may also include input devices and controls such as an alphanumeric keyboard, a pointing device, keypads, pushbuttons, control knobs, microphones, etc., capable of accepting commands or input from the user and transmitting the entered input to the processor 128.

A database 146 may reside on the mass storage memory device 132, and may be used to collect and organize data used by the various systems and modules described herein. The database 146 may include data and supporting data structures that store and organize the data. In particular, the database 146 may be arranged with any database organization or structure including, but not limited to, a relational database, a hierarchical database, a network database, or combinations thereof. A database management system in the form of a computer software application executing as instructions on the processor 128 may be used to access the information or data stored in records of the database 146 in response to a query, where a query may be dynamically determined and executed by the operating system 140, other applications 142, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions which are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system comprising:
a semantic feeder apparatus including:
an image collector module configured, for each of a plurality of travel accommodations, to query at least one data source comprising images associated with the travel accommodation, and to collect at least one image related to the travel accommodation;
an image processor module configured to process each of the at least one image so as to extract an identifying characteristic of the travel accommodation based on features depicted within the at least one image, to convert the identifying characteristic to text, and to correlate the text to at least one searchable text keyword using a thesaurus; and
an output module configured, for the at least one searchable text keyword, to store an association between the travel accommodation, the at least one image related to the travel accommodation, and the text converted from the identifying characteristic of the travel accommodation in a database.

2. The system of claim 1 comprising:
a semantic feeder database for storing data output by the output module,
wherein the system is configured to receive a user request including travel accommodation-specific criteria, search the semantic feeder database for searchable text keywords matching the criteria in the user request, and communicate a list of travel accommodations represented by the searchable text keywords to be displayed on a user interface.

3. The system of claim 2 comprising:
a search reporting component, the search reporting component including a first database configured to store travel accommodation-specific criteria specified by a user for searching a second database of image-related text keywords and, for each set of search criteria, store a number of search results, and a module configured to generate reports including the searches performed over a predetermined period of time,
wherein at least one report is based on the number of results output from searches over the predetermined period of time and concerns missing content in the images related to the travel accommodation.

4. The system of claim 2 wherein the system is configured to activate the semantic feeder apparatus during:

(i) a time of a new image being made available in a data source,
(ii) a time of a new user request, or
(iii) a predetermined timing.

5. The system of claim 2 wherein the semantic feeder database is configured to store data related to hotels, and the semantic feeder apparatus is configured to be in direct communication with at least one hotel reservation system.

6. The system of claim 5 wherein the system is configured, prior to the activation of the semantic feeder apparatus, to:
update the hotel data stored in the semantic feeder database with hotel data stored in at least one database of the hotel reservation system, and
for each hotel, store a pointer in the semantic feeder database to the hotel description in the hotel reservation system.

7. The system of claim 5 comprising:
a data quality reporting component configured to:
determine the data fields that are common to the semantic feeder database and the hotel reservation system database,
compare, for every data field that is common to the semantic feeder database and the hotel reservation system database, the value in both databases,
quantify the compatibility of the values, generate a report on the compatibility between the values, and
raise alerts in the case of discrepancies between the values.

8. The system of claim 7 wherein the data quality reporting component is further configured to:
delete, for a data field that is common to the semantic feeder database and the hotel reservation system database, the data from the semantic feeder database if it is determined to be not compatible with the data in the hotel reservation database.

9. The system of claim 7 wherein the data quality reporting component is further configured to:
determine the priority of either the database of the hotel reservation system or the semantic feeder database regarding a data field common to the database of the hotel reservation system and the semantic feeder database; and
direct the user request to the prioritized database.

10. The system of claim 2 comprising:
at least one client device including the user interface, the at least one client device being connected via a network to the semantic feeder database,
wherein the user request is received via the user interface.

11. A method comprising:
querying, for each of a plurality of travel accommodations, at least one data source comprising images associated with the travel accommodation in order to collect at least one image related to the travel accommodation;
processing the at least one image so as to extract an identifying characteristic of the travel accommodation based on features depicted within the at least one image;
converting the identifying characteristic to text;
correlating the text to at least one searchable text keyword using a thesaurus; and
storing, for the at least one searchable text keyword, an association between the travel accommodation, the at least one image related to the travel accommodation, and the text converted from the identifying characteristic of the travel accommodation in a database.

12. The method of claim 11 further comprising:
receiving a user request comprising travel accommodation-specific criteria via a user interface;
searching the semantic feeder database for searchable text keywords matching the criteria in the user request; and
communicating the travel accommodation represented by the searchable text keywords over a network to at least one client device for display on a user interface of the at least one client device.

13. The method of claim 12 further comprising:
storing, in a first database, travel accommodation-specific criteria specified by a user for searching a second database of image-related text keywords;
for each set of search criteria, storing a number of search results in the second database; and
generating reports concerning the searches performed over a predetermined period of time,
wherein at least one report is based on the number of results output from searches over the predetermined period of time and concerns missing content in the images related to the travel accommodation.

14. The method of claim 12 further comprising:
determining, for a given hotel reservation system, data fields that are common to the semantic feeder database and the hotel reservation system database;
comparing, for every data field that is common to the semantic feeder database and the hotel reservation system database, corresponding values in both databases;
quantifying the compatibility of the values;
generating a report on the compatibility between the values in a data field common to the semantic feeder database and hotel reservation database; and
raising alerts in the case of discrepancies between the values.

15. The method of claim 14 further comprising:
deleting, for a data field that is common to the semantic feeder database and the hotel reservation system database, the data from the semantic feeder database if it is determined not to be compatible with the data in the hotel reservation database.

16. The method of claim 15 further comprising:
when a data field is common to the database of the hotel reservation system and the semantic feeder database, prioritizing either the database of the hotel reservation system or the semantic feeder database; and
directing the user request to the prioritized database.

17. A computer program product comprising:
a non-transitory computer readable storage medium; and
instructions stored on the non-transitory computer readable storage medium that, upon execution by one or more processors, cause the one or more processors to:
query, for each of a plurality of travel accommodations, at least one data source comprising images associated with the travel accommodation in order to collect at least one image related to the travel accommodation;
process the at least one image so as to extract an identifying characteristic of the travel accommodation based on features depicted within the at least one image;
convert the identifying characteristic to text;
correlate the text to at least one searchable text keyword using a thesaurus; and store, for the at least one searchable text keyword, an association between the travel accommodation, the at least one image related to the travel accommodation, and the text converted from the identifying characteristic of the travel accommodation in a database.

* * * * *